United States Patent [19]
Bott

[11] Patent Number: 4,944,439
[45] Date of Patent: Jul. 31, 1990

[54] ARTICLE CARRIER

[76] Inventor: John A. Bott, 931 Lakeshore Dr., Grosse Pointe Shores, Mich. 48236

[21] Appl. No.: 442,208

[22] Filed: Nov. 28, 1989

Related U.S. Application Data

[63] Continuation of Ser. No. 207,062, Jun. 13, 1988, abandoned.

[51] Int. Cl.⁵ ............................................. B60R 9/04
[52] U.S. Cl. .................................... 224/326; 224/309
[58] Field of Search ............... 224/309, 319, 314–317, 224/321–326

[56] References Cited

U.S. PATENT DOCUMENTS

| | | | |
|---|---|---|---|
| Re. 26,538 | 3/1969 | Bott | 224/326 |
| Re. 26,539 | 3/1969 | Bott | 224/321 |
| 965,658 | 7/1910 | Reubel | 248/262 |
| 1,096,282 | 5/1914 | Boehm | 248/251 |
| 2,525,933 | 10/1950 | Nantz | 114/39.1 |
| 3,223,302 | 12/1965 | Helm | 224/319 |
| 3,330,454 | 7/1967 | Bott | 224/316 |
| 3,451,602 | 6/1969 | Bott | 224/321 |
| 3,596,861 | 8/1971 | Baldini | 248/224 |
| 3,675,883 | 7/1972 | Holmes et al. | 248/251 |
| 3,719,313 | 3/1973 | Tischler | 224/309 |
| 3,799,603 | 3/1974 | Bott | 296/180.1 |
| 3,856,193 | 12/1974 | Bott | 224/316 |
| 4,155,585 | 5/1979 | Bott | 296/180.5 |
| 4,274,568 | 6/1981 | Bott | 224/319 |
| 4,299,346 | 11/1981 | Helm | 224/325 |
| 4,339,145 | 7/1982 | Bott et al. | 296/180.1 |
| 4,489,868 | 12/1984 | Thirion | 224/321 |
| 4,534,496 | 8/1985 | Bott | 224/326 |
| 4,767,041 | 8/1988 | Stapleton | 224/326 |

FOREIGN PATENT DOCUMENTS

| | | | |
|---|---|---|---|
| 1247540 | 11/1986 | Japan | 224/309 |
| 649165 | 1/1951 | United Kingdom | |

*Primary Examiner*—Henry J. Recla
*Assistant Examiner*—Casey Jacyna

[57] ABSTRACT

The present invention is a retaining assembly for retaining a cross bar to a bracket which is mounted on a slat of an automobile. The assembly includes a plurality of flanges extending outwardly from the cross bar toward the bracket. The assembly further includes means for cooperating with the flanges for retaining the cross bar to the bracket.

20 Claims, 2 Drawing Sheets

ARTICLE CARRIER

This a continuation of U.S. patent application Ser. No. 07/207,062, filed June 13, 1988 entitled ARTICLE CARRIER, abandoned 11- 29-89.

BACKGROUND OF THE INVENTION

1. Field of the Invention

The present invention relates to article carriers for automotive vehicles, more particularly to, a retaining assembly for an article carrier on automotive vehicles.

2. Description of Related Art

Automobile luggage racks frequently employ two different sub-assemblies or portions: a generally rectangular framework which surrounds the load to be carried; and a plurality of slats wich rest on the roof or other automobile body surface and carry the weigth of the load. In such constructions, the framework and the slats are often secured to the automobile body independently of one another or the slats are connected to the body through the framework by means of special cross straps. In still another automobile luggage or article carrier, the means confining the luggage and supporting its weight are formed into one unitary welded tubular assembly.

Some luggage racks or article carriers have been designed such that a transversely extending cross bar replaced the framework. Typically, the cross bar is secured at its ends through mounting brackets to corresponding slats. The cross bar is used to restrain longitudinal movement of the load at one end of the slats.

In my prior U.S. Pat. No. 4,099,658, I disclosed an article carrier having a cross bar to accommodate a load. This construction has achieved significant commercial success. Nevertheless, some prbolems have been experienced by not securing the central portion of the cross bar to a corresponding slat. It is believed that a need exists for a luggggage rack which has the attractive appearance of modern mounted luggage carriers with cross bars, but which possesses a retaining assembly for securing the central portion of the cross bar to a corresponding slate which is hidden from the outward appearance.

SUMMARY OF THE INVENTION

The present invention is a retaining assembly for retaining a cross bar to a bracket which is mounted on a slat of an automobile. The assembly includes means forming a plurality of flanges extending outwardly from the cross bar toward the bracket. The assembly further includes means for cooperating with the flanges for retaining the cross bar to the bracket.

Among the objects of the present invention are the provision of an article carrier for an automobile in which a portion of a cross bar is secured to a corresponding slat. It is another object of the present invention of an article carrier of the foregoing type in which a retaining assembly is hidden from the outward appearance of the article carrier.

BRIEF DESCRIPTION OF THE DRAWINGS

Throughout the various modifications of the present invention identical parts are identified by the same reference numerals.

DESCRIPTION OF THE PREFERRED EMBODIMENT

Figure 1:
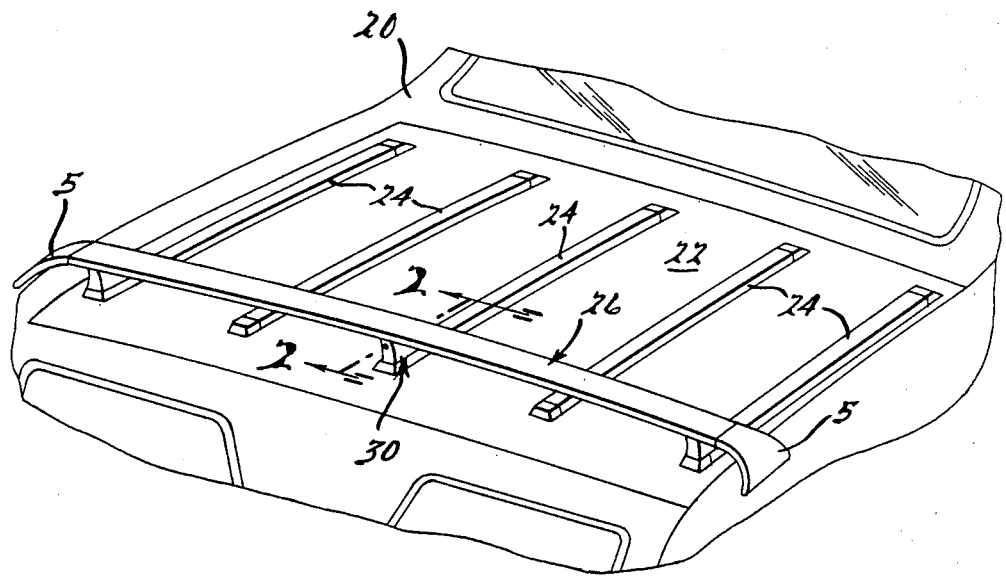
FIG. 1 is a fragmentary perspective view of an automobile having an article carrier mounted thereon which is constructed in accordance with the principles of the present invention.

FIG. 1 depicts an automobile 20 having a trunk lid 22 on which are mounted a plurality of identical, parallel, transversely spaced slats 24. Although the slats 24 are shown mounted on the trunk lid 22, the article carrier of the present invention may be mounted with equal utility on an automobile roof or any other generally horizontal exterior body portion of an automobile. Mounted on a pair of the slats 24 is a raised tubular cross bar 26 such as a restraining bar or spoiler which is fitted at its opposite end 5 onto brackets 28. The brackets 28 are secured to the slats 24 by means such as fasteners. The cross bar 26 is also supported substantially near its center by a bracket 30 which is secured in a known manner to a corresponding slat 24.

Figure 2:
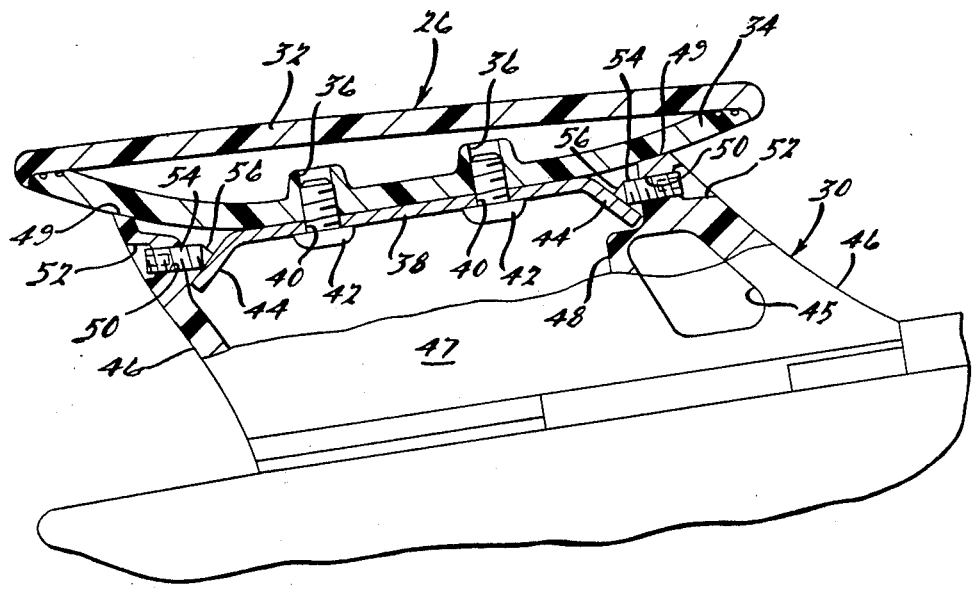
FIG. 2 is an enlarged partially broken view of the structure illustrated in FIG. 1 taken along line 2—2 thereof.

Referring to FIG. 2, the cross bar 26 is a two-piece member having a first or upper bar member 32 which is generally flat or planar and a second or lower bar member 34 which is generally arcuate in cross-section. The first bar member 32 and second bar member 34 are secured together by means such as an adhesive between the ends of the arcuate shape of the second bar member 34 and the first bar member 32. The second bar member 34 also includes means forming at least one, preferably a pair of longitudinally spaced apertures 36 which are threaded. A retaining member 38 includes means forming corresponding apertures 40 in alignment with the apertures 36 of the second bar member 34 to allow fateners 42 to pass therethrough for securing the reataining member 38 to the second bar member 34. The retaining member 38 also includes flanges or ends 44 which are at an angle or inclined relative to its generally planar shape toward the trunk lid 22 and abuts the second bar member 34.

The barcket 30 includes an aperture or eyelet 45 adapted to receive a rope strap or other device intended to tie-down luggage or the like on the slats 24. The bracket member 30 also includes end walls 46 and side walls 47 extending upwardly from the trunk lid 22 to form a generally rectangular shape having a cavity 48 therein. The end walls 46 have end surfaces 49 that are complimentary to the arcuate shape of the second bar member 34 to allow the second bar member 34 to rest upon the bracket member 30. The retaining member 38 is then disposed within the cavity 38. The retaining member 38 and fasteners 42 are hidden from the outward appearance of the article carrier.

Each end wall 46 includes means forming an aperture 50 which is threaded communicating through the end wall 46 and a countersunk portion 52 extending longitudinally from one end of aperture 50. A means such as a fastener 54 is threadably engagable with the aperture 50 and cooperates with the retaining member 38 to prevent longitudinal and vertical or radial movment of the retaining member 38 to secure the cross bar 26 to the bracket 30. The fastener 54 preferably has an end portion 56 with a conical shape complimentary to flange 44 of the retaining member 44. A head portion 58 of the fastener 54 is disposed within the countersunk portion 52 to hide or conceal its outward appearance from view.

Figure 3:
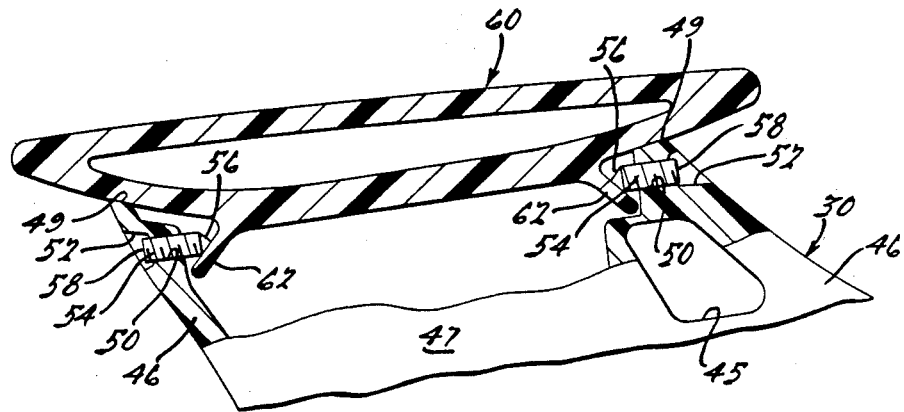
FIG. 3 is a view of the structure similarly illustrated in FIG. 2 showing a modified form of the present invention.

FIG. 3 illustrates another form of the present invention in which a cross bar 60 is formed as a one-piece integral member from the first and second bar members 32, 34. The cross bar 60 is similar in shape to the first 32 and second 34 bar members as assembled without apertures 36. Additionally, the cross bar 60 includes end or flange portions 62 diverging downwardly and outwardly similar to retaining member 38. In other words, the cross bar 60 has the retaining member 38 formed as an integral member to allow the cross bar 60 to be secured to the bracket 30, eliminating the need for fasteners 42. The cross bar 60 is secured to the bracket 30 in a similar manner as the embodiment of FIG. 2.

Figure 4:
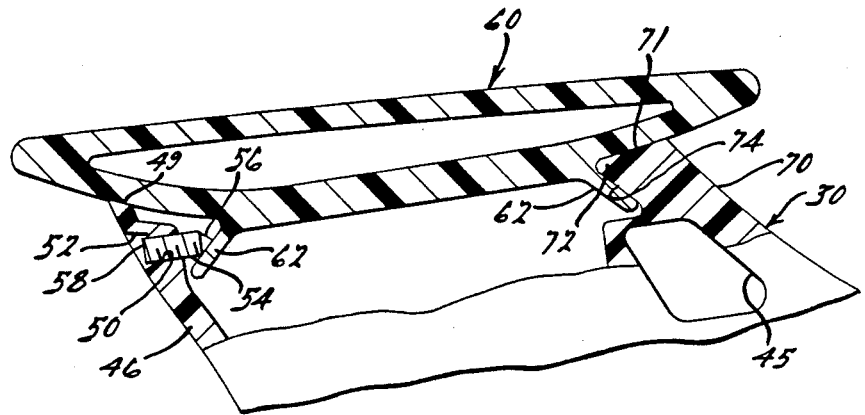
FIG. 4 is a view of the structure similarly illustrated in FIG. 2 showing still another form of the present invention.

FIG. 4 illustrates still another form of the present invention in which an end wall 70, similar to end wall 46 of the bracket 30, is formed without aperture 50 or countersunk portion 52. End wall 70 includes an end surface 71 complementary in shape to the arcuate portion of the cross bar 60. End wall 70 further includes a protrusion 72 extending toward end wall 46 and having a relief surface 74 complementary in shape to the flange portion 62 of cross bar 60. The protrusion 72 cooperates with flange portion 62 to retain one side of the cross bar 60 to the bracket 30 by preventing longitudinal and radial or upward movement of the flange portion 62.

Figure 5:
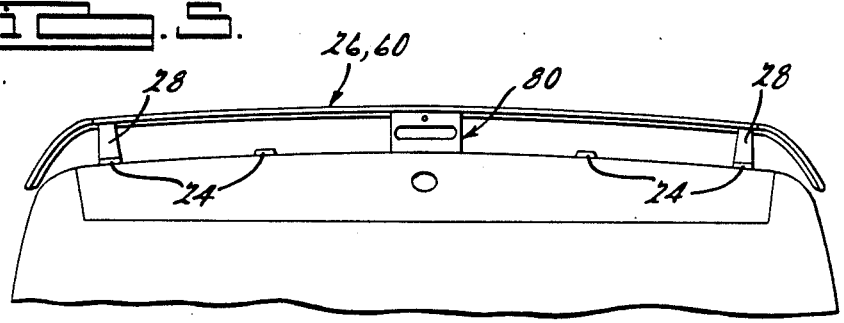
FIG. 5 is a view of the structure similarly illustrated in FIG. 1 showing another modified form of the present invention.

FIG. 5 illustrates another form of the present invention in which a brake light structure 80 is substituted for the bracket 30. The brake light structure 80 may have a cross-section similar to the bracket 30 as shown in FIG. 2 through FIG. 4 to allow the cross bar 26 or 60 to be retained to the brake light structure 80.

The present invention has been described in an illustrative manner. It is to be understood that the terminology which has been used is intended to be in the nature of words of description rather than of limitation.

Obviously, many modifications and variations of the present invention are possible in light of the above teachings. Therefore, the present invention may be practiced otherwise than as specifically described.

What is claimed is:

1. In an article carrier for carrying articles on a vehicle including at least one longitudinally extending support member adapted to be mounted on a generally horizontally extending body surface, a bracket having a first end mounted on the support member and extending upwardly to a second end and having means forming a cavity therein, and a cross bar extending laterally to the support member and disposed upon the second end of the bracket, a retaining assembly for retaining the cross bar to the bracket, said assembly comprising:

means forming a retaining member having a planar portion extending longitudinal and substantially parallel to the body surface and a flange at each end of said planar portion extending longitudinally and downwardly from the cross bar toward the body surface surface that said flange is inclined relative to said planar portion, said reataining member being disposed within the cavity; and means on the bracket at each longitudinal end thereof for cooperating with said flanges for preventing longitudinal and vertical movement of said retaining member relative to said bracket for retaining the cross bar to the bracket.

2. An assembly as set forth in claim 1 including fastening means for securing said retaining member to the cross bar.

3. An assembly as set forth in claim 2 wherein said fastening means comprises at least one fastener communicating through at least one longitudinal end wall of the bracket and cooperating with said flange of said retainer member.

4. An article carrier for an automobile adapted to be fixedly secured on a generally horizontally exterior automobile body surface, comprising:

a plurality of slats extending generally longitudinally of the automobile;

said slats having an upper article supporting surface;

at least a pair of end bracket members disposed upon a corresponding pair of said slats;

a wind deflector extending laterally between and secured to said end bracket members;

a support bracket member mounted to another of said slats and spaced transversely between said pair of slats;

said support bracket member including means forming end and side walls extending upwardly to form a cavity therein;

means forming at least a pair of longitudinally spaced flanges extending longitudinally outwardly from said wind deflector and downwardly toward the automobile body surface and disposed within said cavity; and means on said support bracket member for cooperating with said flanges for retaining said wind deflector to said support bracket member.

5. An assembly as set forth in claim 4 wherein said flange means comprises a retaining member having one of said flanges at each end.

6. An assembly as set forth in claim 5 including fastening means for securing said retaining member to the wind deflector.

7. An assembly as set forth in claim 6 wherein said cooperating means comprises a fastener communicating through at least one end wall of said support bracket member and cooperating with one of said flanges of said retainer member to prevent radial and longitudinal movement of said retainer member relative to said support bracket member.

8. An assembly as set forth in claim 5 wherein said retainer member is formed integral with said wind deflector.

9. An assembly as set forth in claim 8 including fastening means for securing said retaining member to the cross bar.

10. An assembly as set forth n claim 9 including a fastener communicating through at least one end wall of the support bracket member and cooperating with said flange of said retainer member to prevent radial and longitudinal movement of said retainer member relative to said support bracket member.

11. An assembly as set forth in claim 10 wherein the other of said end walls of said support bracket member includes a protrusion complementary to said flange and disposed between said flange and the lower surface of said wind deflector to prevent radial and longitudinal movement of said retainer member relative to said support bracket member.

12. An article carrier for an automobile adpated to be fixedly secured on a generally horizontal exterior automobile body surface, comprising:
   a plurality of slats extending generally longitudinally of the automobile;
   said slats having an upper article supporting surface;
   at least a pair of end bracket members disposed upon a corresponding pair of said slats;
   a spoiler extending laterally between and secured to said end bracket members;
   a support bracket member mounted to another of said slats and spaced transversely between said pair of slats;
   said support bracket member including means forming end and side walls extending upwardly to form cavity therein;
   means forming at least a pair of longitudinally spaced flanges extending longitudinally outwardly from said spoiler and downwardly toward the automobile body surface and disposed within said cavity; and
   means on said support bracket member for cooperating with said flanges for retaining said spolier to said support bracket member.

13. An assembly as set forth in claim 12 wherein said flanges extend longitudinally away from each other.

14. An assembly as set forth in claim 13 wherein said support bracket member end with a surface shaped complementary to said spoiler for mating engagement.

15. An assembly as set forth in claim 14 wherein said support bracket member includes an aperture extending laterally through said side walls to form a tie-down member.

16. An assembly as set forth in claim 12 wherein said spoiler comprises an upper and a lower member, said upper member and said lower member being secured at the longitudinal ends thereof.

17. An assembly as set forth in claim 16 wherein said lower member has an arcuate cross-section.

18. An article carrier for an automobile adapted to be fixedly secured on a generally horizontally exterior automobile body surface comprising:
   a plurality of parallel slats extending generally longitudinally of the automobile;
   said slats having an upper article supporting surface;
   a pair of outer bracket members, each of said outer bracket members being laterally spaced from each other upon corresponding slats and having a first end disposed upon said upper article supporting surface and extending upwardly to a second end, and a cross bar extending between and secured upon said second end of said outer bracket members;
   an interior bracket member spaced laterally between said outer bracket members and mounted upon another of said slats and having a first end disposed upon said upper article supporting surface and extending upwardly to a second end;
   said interior bracket member including end and side walls extending upwardly between said first and second ends to form a cavity therein;
   said cross bar including means forming a plurality of flanges, at least one flange extending longitudinally outwardly from said cross bar and downwardly toward the automobile body surface and disposed within said cavity of said interior bracket member; and
   means on said interior bracket member for cooperating with said flanges for retaining said cross bar to said interior bracket member.

19. An article carrier as set forth in claim 18 wherein said interior bracket member is a brake light structure.

20. In an article carrier for carrying articles on a vehicle including at least one longitudinally extending support member adapted to be mounted on a generally horizontally extending body surface, a bracket having a first end mounted on the support member and extending upwardly to a second end and having means forming a cavity therein, and a cross bar extending laterally to the support member and disposed upon the second end of the bracket, a retaining assembly for retaining the cross bar to the bracket, said assembly comprising:
   means forming a retaining member having a planar portion extending longitudinally and substantially parallel to the body surface and a flange at each end of said planar portion extending longitudinally and downwardly from the cross bar toward the body surface such that said flange is inclined relative to said planar portion, said retaining member being disposed within the cavity; and
   means on the bracket at each longitudinally end thereof for cooperating with said flanges for preventing longitudinal and vertical movement of said retaining member relative to said bracket for retaining the cross bar to the bracket.

* * * * *

UNITED STATES PATENT AND TRADEMARK OFFICE
CERTIFICATE OF CORRECTION

PATENT NO. : 4,944,439

DATED : July 31, 1990

INVENTOR(S) : John A. Bott

It is certified that error appears in the above-identified patent and that said Letters Patent is hereby corrected as shown below:

Col. 1, Line 19 "weigth" should be --weight--;

Col. 1, Line 30 "replaced" should be --replaces--;

Col. 1, Line 44 "slate" should be --slat--;

Col. 2, Line 46 "fateners" should be --fasteners--;

Col. 2, Line 52 "barcket" should be --bracket--;

Col. 2, Line 62 "cavity 38" should be --cavity 48--;

Col. 3, Line 6 "complimentary" should be --complementary--;

Col. 3, Line 7 "member 44" should be --member 38--;

Col. 3, Line 62 "longitudinal" should be --longitudinally--;

Col. 3, Line 66 "surface" 2nd occurrence should be --such--;

UNITED STATES PATENT AND TRADEMARK OFFICE
CERTIFICATE OF CORRECTION

PATENT NO. : 4,944,439

DATED : July 31, 1990

INVENTOR(S) : John A. Bott

It is certified that error appears in the above-identified patent and that said Letters Patent is hereby corrected as shown below:

Col. 3, Line 67 "reataining" should be --retaining--;

Col. 4, Line 10 "fastening" should be --cooperating--;

Col. 4, Line 56-57 "the cross bar" should be --said wind deflector--;

Col. 4, Line 58 "n" should be --in--;

Col. 5, Line 3 "adpated" should be --adapted--;

Col. 5, Line 4 "horizontal" should be --horizontally--;

Col. 5, Line 18 after "form" insert --a--;

Col. 5, Line 37 after "upper" insert --member--;

Col. 6, Line 4 after "extending" insert --laterally--;

UNITED STATES PATENT AND TRADEMARK OFFICE
CERTIFICATE OF CORRECTION

PATENT NO. : 4,944,439

DATED : July 31, 1990

INVENTOR(S) : John A. Bott

It is certified that error appears in the above-identified patent and that said Letters Patent is hereby corrected as shown below:

Col. 6, Line 44 "longitudinally" should be --longitudinal--.

Signed and Sealed this

Twenty-first Day of January, 1992

Attest:

HARRY F. MANBECK, JR.

Attesting Officer

Commissioner of Patents and Trademarks